United States Patent [19]

Cha et al.

[11] Patent Number: 5,597,603
[45] Date of Patent: Jan. 28, 1997

[54] SUGAR-FREE, FAT-FREE INSTANT PUDDING MIX

[75] Inventors: Alice S. Cha, Mt. Kisco; William J. Dell, Wappinger Falls, both of N.Y.

[73] Assignee: Kraft Foods, Inc., Northfield, Ill.

[21] Appl. No.: 396,318

[22] Filed: Feb. 28, 1995

[51] Int. Cl.$^6$ .......................... A23L 1/0522; A23L 1/054
[52] U.S. Cl. .......................... 426/573; 426/578; 426/579
[58] Field of Search .................... 426/573, 578, 426/579

[56] References Cited

U.S. PATENT DOCUMENTS

| | | | |
|---|---|---|---|
| 2,607,692 | 8/1952 | Kennedy et al. | 426/167 |
| 2,801,924 | 8/1957 | Clausi et al. | 426/167 |
| 2,829,978 | 4/1958 | Castagna et al. | 426/167 |
| 2,927,861 | 3/1960 | Charie et al. | 426/167 |
| 3,934,049 | 1/1976 | Lauck | 426/576 |
| 4,006,262 | 2/1977 | Smith et al. | 426/573 |
| 4,280,851 | 7/1981 | Pitchon et al. | 127/33 |
| 4,361,592 | 11/1982 | Carpenter et al. | 426/579 |
| 4,469,712 | 9/1984 | Katcher et al. | 426/579 |
| 4,504,512 | 3/1985 | Danielson et al. | 426/579 |
| 4,663,177 | 5/1987 | Weaver et al. | 426/579 |
| 4,847,371 | 7/1989 | Schara et al. | 536/111 |
| 4,871,398 | 10/1989 | Katcher et al. | 127/71 |
| 4,944,955 | 7/1990 | Bassa et al. | 426/579 |

OTHER PUBLICATIONS

JELL–O® Sugar–Free Instant Pudding Ingredient Line, Kraft General Foods, Inc. Jun. 1992.

*Primary Examiner*—Jeanette Hunter
*Attorney, Agent, or Firm*—Thomas R. Savoie; Thomas A. Marcoux

[57] ABSTRACT

A dry instant pudding mix for producing a sugar-free and fat-free instant pudding which contains 50% to 70% agglomerated pregelatinized starch, 5% to 23% maltodextrin, 0.1% to 1.5% xanthan gum, phosphate setting salts, 0.1% to 0.8% of a slow-reacting calcium salt, such as calcium sulfate, an intensive sweetener, opacifier, emulsifier, flavor and color.

20 Claims, No Drawings

SUGAR-FREE, FAT-FREE INSTANT PUDDING MIX

BACKGROUND OF THE INVENTION

Field of the Invention

The present invention relates to a dry, sugar-free instant pudding mix which is adapted for rehydration with skim milk or low-fat milk to produce sugar-free, no/low-fat puddings.

In traditional cooked-starch puddings, a mixture of starch, sugar, liquid medium and various flavoring ingredients is heated at boiling temperature for a time sufficient for the starch granules to undergo progressively increasing stages of water absorption, swelling and loss of birefringence, along with leaching out of soluble portions of the starch. The aqueous mixture increases greatly in viscosity and, upon cooling, sets to a gelatinous structure having an organoleptically-acceptable firm yet smooth, creamy texture.

To accommodate consumer demand for convenience products, food processors developed compositions which are now commonly referred to as instant puddings. In these products, a packaged sugar and starch containing dry mix is provided which can be hydrated by the consumer with milk without need for cooking, and then refrigerated to produce a set or gelled pudding. In order to provide the viscous and smooth texture found in the counterpart traditional cooked-starch puddings, these instant pudding mixes generally contain starch in pregelatinized form, i.e., a form which provides thickening upon hydration without need for cooking. To provide the gelled or set texture achieved in the traditional cooked product, the art has generally relied upon phosphate gelling agents which act by coagulating milk proteins (provided in the mix or through use of milk as the hydrating medium). See, for example, U.S. Pat. Nos. 2,607,692 to Kennedy, et al.; 2,801,924 to Clausi; 2,829,978 to Castagna, et al.; and 2,927,861 to Charie, et al. In the years since original development of instant pudding mixes, considerable formula optimization and refinement has been undertaken such that the pudding products made therefrom now are considered by consumers to provide textural and eating characteristics which are good approximations of the characteristics of traditional cooked-starch puddings.

In recent years, sugar-free instant pudding mixes have been developed and made commercially available. These mixes have had good consumer acceptance because the puddings made from these mixes have a texture, sweetness and overall flavor impact, which is perceived as comparable to puddings made from sugar-containing instant pudding mixes. U.S. Pat. No. 4,663,177 to Weaver, et al. discloses examples of sugar-free, instant pudding mixes and recites some of the difficulties in eliminating sugar from the traditional instant puddings mixes.

A more recent trend in consumer preference is for products which are both sugar-free and fat-free. Commercially-available instant pudding mixes have heretofore required hydration with whole milk, or at least 2% fat milk, to produce puddings with good texture, flavor and mouthfeel. Prior commercial, instant pudding mixes could not produce quality pudding with skim milk. The absence of fat from the final pudding usually provided by conventional whole or reduced fat milk has significant adverse effect on the desired setting and textural characteristics of the pudding.

SUMMARY OF THE INVENTION

In accordance with the present invention, an instant sugar-free, fat-free instant pudding mix is provided which, upon hydration with skim milk, produces puddings which exhibits setting and textural parameters comparable to those exhibited by instant pudding made with whole (3.5% fat) or reduced fat (1 or 2% fat) milk. In fact, as shown in the Examples, the pudding mix of this invention rehyrated with skim milk was preferred to a commercial, sugar-free pudding mix rehydrated with 2% fat milk. The dry mix of this invention is comprised of agglomerated, pregelatinized starch, maltodextrin, nonsugar sweetener, phosphate gelling agents, xanthan gum and slow-reacting calcium salt. The pudding mix of this invention may also be prepared into quality instant pudding using low-fat or whole milk as the hydrating medium.

According to this invention, the agglomerated, pregelatinized starch is the major component of the instant pudding mix, typically constituting over 50% by weight of the dry mix. The agglomerated starch is significantly more dispersible than unagglomerated starch. Starch dispersibility is an important feature in a sugar-free pudding mix, since sugar which is present in sugar-containing pudding mix at levels of about 50% or more, is not present to aid in dispersion. The starch will be present at a level which is at least 3 times greater, preferably 3.5 times greater, than the maltodextrin component.

Phosphate salts, slow-reacting calcium salts and xanthan gum components will be present at critical levels and ratios in order to obtain the desired setting and textural characteristics in the final sugar-free, fat-free pudding product.

This invention will be described and numerical weight ranges set forth for a typical vanilla-flavored, sugar-free, instant pudding mix (for fat-free pudding) which contains artificial and natural flavor components amounting to only a small weight percent, typically less than 2%, of the pudding mix formulation. In the instance where a chocolate-flavored, sugar-free (for fat-free pudding) pudding mix is desired, cocoa, typically a lecithinated cocoa/defatted cocoa blend, is normally present at a level which is about 25% by weight of the pudding mix. Thus the weight ranges applicable to vanilla-flavored pudding mixes will translate to chocolate-flavored pudding mixes only if the cocoa component is discounted. All percentages and ratios set forth in the description and claims of this invention are by weight.

DESCRIPTION OF THE PREFERRED EMBODIMENTS

Sugar-free, fat free instant pudding is prepared by hydrating the powdered dessert mix of this invention with skim milk and allowing the hydrated mix to set for several minutes. The mix is comprised of 50 to 70% agglomerated, pregelatinized starch, 5 to 23% carbohydrate bulking agent, 3 to 8% alkali metal pyrophosphate, 3 to 7% alkali metal orthophosphate, 0.1 to 1.5% xanthan gum, and 0.1 to 0.8% slow-reacting calcium salt. The pudding mix will also contain additional functional ingredients such as intensive sweeteners, emulsifiers, flavors, color and opacifiers, which are known to skilled food technologists.

The agglomerated, pregelatinized starch is preferably a spray-cooked starch, such as described in U.S. Pat. Nos. 4,280,851 to Pitchon et al. and 4,847,371 to Schara et al. each of which is hereby incorporated by reference. Starch agglomerates can be formed by grinding the spray-cooked particles to a particle size distribution, wherein 6% to 34% by weight of the particles are between 38 and 44 microns and 3% to 30% by weight of the particles are between 44 and 63 microns, and thereafter agglomerating the ground particles in a fluid bed agglomerator using a water spray as an agglomeration fluid. Alternatively, agglomeration can take place using the spray-drying technique disclosed in U.S. Pat. No. 4,871,398 to Katcher et al. Preferably, the starch agglomerates will have a particle size distribution wherein less than 8% by weight are larger than 840 microns and less than 30% by weight are smaller than 149 microns. A preferred level for the starch in the pudding mix is 55% to 65%.

The carbohydrate bulking agent employed in the pudding mix can be any non-sugar carbohydrate which is capable of providing solids to the hydrated pudding and which promotes dispersibility of the dry mix ingredients when hydrated (thereby replacing an important function of the sugar in sugar-containing mixes). The bulking agent will preferably constitute from 10% to 20% of the dry ingredients of the pudding mix. Considerable care should be taken to insure that this component not possess any off-flavors or other attributes which might adversely affect the organoleptic properties of the final pudding product. Among the preferred bulking agents are maltodextrins of relatively low dextrose equivalent (i.e., DE of less than about 15). These bulking agents can be employed in spray-dried or agglomerated form and are present both to help in dispersing the other ingredients and to provide body to the final pudding. Other possible carbohydrate bulking agents would be modified starches, polydextrose and the like. A suitable particle size distribution for a spray-dried maltodextrin is maximum 10% larger than 250 microns and less than 50% smaller than 44 microns.

The alkali metal pyrophosphate contained in the dry pudding mix reacts with the protein and calcium present in the hydrated pudding mix to produce a gel structure. The term alkali metal pyrophosphate is meant to include all water-soluble, edible, alkali metal pyrophosphates. Principal among these are the di- and tetra-sodium and potassium pyrophosphates. Preferred among these is tetra sodium pyrophosphate. The alkali metal pyrophosphate is preferably contained in the mix at a level of 3.5% to 6%.

The alkali metal orthophosphate accelerates the gelling reaction given the presence of calcium, protein and alkali metal pyrophosphate. Among the most suitable orthophosphates are the di- and tri-sodium salts, with disodium orthophosphate being preferred. These salts are preferably contained in the mix at a level of 3.5% to 6%.

The particle size of the alkali pyrophosphate and alkali orthophosphate components should preferably be 100% (by weight) passed through a No. 80 U.S. Standard Sieve (opening 0.177 mm). This small particle size is desirable to permit the phosphates to quickly enter into solution.

The structure provided by the phosphate gelling agents is augmented by the presence of xanthan gum which, although not a gelling hydrocolloid, provides increased viscosity and mouthfeel and controls synerisis in the prepared pudding. A preferred level for xanthan gum in the dry pudding mix is 0.4% to 0.8%.

The combined structural effects of the milk protein-phosphate gel system and thickening by means of the pregelatinized starch and xanthan gum are able to produce a desirable pudding when either whole milk or low-fat (2%) milk is utilized as the rehydration medium. However, when skim milk is utilized to rehydrate, such a dry pudding mix does not possess the desired mouthfeel and texture due to the absence of fat. It has now been found that a small amount of a slow-reacting (i.e., slowly soluble) calcium salt added to the dry pudding mix is highly beneficial when skim milk is used as the hydrating medium. It is speculated that the interaction between the slow-reacting calcium salt, phosphates and milk proteins simulate the function of fat in the pudding system. In order to obtain the most desirable texture, the added calcium should follow the phosphates into solution.

The slow-reacting calcium salt will preferably be present in the mix at a level of 0.2% to 0.6%, most preferably 0.3% to 0.4%. The slow-reacting calcium salt is preferably selected from the group consisting of tricalcium citrate, calcium sulfate and combination thereof. Calcium sulfate is the most preferred added calcium salt and typically will be present in the mix at a level which equates to 0.08 to 0.18 grams per 16 ounces (474 ml) of the skim milk hydration medium.

The texture of the pudding described above is primarily the result of the large, agglomerated pregelatinized starch component with the phosphate setting salts providing a gel structure to the pudding. Xanthan gum, as noted above, is present to impart increased smooth, creamy mouthfeel to the pudding and also to control syneresis; however, the xanthan gum component is kept at a low level in order to avoid having the pudding becoming too elastic. Calcium sulfate is incorporated into the dry pudding mix of this invention in order to increase thickness of puddings prepared with skim milk by aiding the calcium-phosphate-milk protein gel. The sugar-free, fat-free pudding will be thin in the absence of this calcium sulfate component.

According to this invention, the calcium to phosphate ratio, for the added calcium and phosphate salts contained in the pudding mix, should be within the range of 0.01–0.08:1.0, preferably 0.03–0.05:1.0.

The intensive sweetening agent for use in the sugar-free pudding mix of this invention is preferably a dipeptide sweetener, such as aspartame, either alone or, more preferably, in combination with another intensive sweetener, such as acesulfame-K, dihydrochalcone, cyclamate, saccharine and/or sucralose. The level of these non-sugar sweetening agents will be adjusted to provide the desired sweetness level and to mimic the sweetness profile of sucrose.

The pudding mix will also contain one or more emulsifiers which will typically be a combination of mono- and diglycerides. These emulsifiers are well known for use in instant pudding mixes and are useful to minimize the foaming which can occur when the pudding mix is mixed with milk. The emulsifier may be employed in the form of a spray-dried material having a carbohydrate and/or non-fat milk solids matrix. The use level will typically be about 0.2% to 1% mono- and diglycerides by weight of the dry pudding mix. A description of suitable mono- and diglyceride emulsifiers can be found in U.S. Pat. No. 4,504,512 to Danielson et al.

In order to provide desired opacity to the prepared sugar-free, fat-free pudding, an opacifying agent will typically be included in the dry mix. Titanium dioxide is the most common opacifier and may be present in the mix at levels from 0.2% to 1.0% Usually, titanium dioxide is present as a component of a spray-dried opacifying agent which also can include maltodextrin and/or a gum (e.g., gum arabic) as a carrier.

Various color and flavor agents, including salt, will be contained in the dry pudding mix in order to provide the appropriate visual and taste characteristics expected by the consumer.

The invention is further illustrated but not limited by the following examples:

EXAMPLE 1

A dry mix for the preparation of an instant, vanilla, sugar-free, fat-free pudding is formulated with the following ingredients:

| Ingredient | Weight % |
|---|---|
| Agglomerated Spray-Dried Starch | 62–64 |
| Maltodextrin (10 DE) | 15–17 |
| Tetrasodium Pyrophosphate | 5–6 |
| Disodium Phosphate, Anhydrous | 4–5 |
| Xanthan Gum | 0.6–0.7 |
| Calcium Sulfate | 0.3–0.35 |
| Intensive Sweeteners | 0.6–0.9 |
| Opacifying Agent | 1–5 |
| Spray-Dried Emulsifier (60% mono- and diglycerides) | 0.5–1.0 |
| Color and Flavor Agents | (as appropriate) |

EXAMPLE 2

Thirty-one grams of the dry mix of Example 1 was added to a bowl containing 474 ml (2 cups) of cold skim milk. The mixture was stirred with a wire whisk for one to two minutes until fully blended. The mixture set to form a sugar-free, fat-free pudding in about five minutes. The pudding possessed a smooth, creamy texture and was preferred by consumers 60% to 40% (at the 95% confidence level) when compared to a vanilla pudding made with low-fat (2%) milk and a similar, instant, sugar-free vanilla pudding mix which did not contain calcium sulfate.

The pudding mix of Example 1 was also prepared into puddings using low (2%) fat milk and whole milk as the rehydrating medium. In each instance, the prepared sugar-free puddings were highly rated by consumers.

Having thus described the invention, what is claimed is:

1. A dry mix for preparing a sugar-free, fat-free instant pudding; said mix comprising of: 50% to 70% agglomerated, pregelatinized starch, 5% to 23% carbohydrate bulking agent, 3% to 8% alkali metal pyrophosphate, 3% to 7% alkali metal orthophosphate, 0.1% to 1.5% xanthan gum, 0.1% to 0.8% slow-reacting calcium salt, emulsifier, intensive sweetening agent, flavor agent and color agent.

2. The mix of claim 1 wherein the starch is a spray-cooked starch at a level of 55% to 65%.

3. The mix of claim 1 wherein the bulking agent is a maltodextrin having a D.E. of less than 15 at a level of 10% to 20%.

4. The mix of claim 1 wherein the alkali metal pyrophosphate is present at a level of 3.5% to 6% the alkali metal orthophosphate is present at a level of 3.5% to 6% and each of these phosphates have a particle size distribution wherein 100% (by weight) passes through a No. 80 U.S. Standard Sieve.

5. The mix of claim 1 wherein the level of xanthan gum is 0.4% to 0.8%.

6. The mix of claim 5 wherein the calcium salt is calcium sulfate and the level is 0.3% to 0.4%.

7. The mix of claim 1 wherein the level of calcium salt is 0.2% to 0.6%.

8. The mix of claim 1 wherein the calcium salt is calcium sulfate and the level is 0.3% to 0.4%.

9. The mix of claim 1 wherein the added calcium to phosphate ratio is 0.01–0.08:1.0.

10. The mix of claim 1 wherein the added calcium to phosphate ratio is 0.03–0.05:1.0.

11. A dry mix for preparing a sugar-free, fat-free instant pudding; said mix consisting essentially of: 50% to 70% agglomerated, pregelatinized starch, 5% to 23% carbohydrate bulking agent, 3% to 8% alkali metal pyrophosphate, 3% to 7% alkali metal orthophosphate, 0.1% to 1.5% xanthan gum, 0.1% to 0.8% slow-reacting calcium salt, emulsifier, opacifier, intensive sweetening agents, flavor agents and color agents.

12. The mix of claim 11 wherein the starch is a spray-cooked starch at a level of 55% to 65%.

13. The mix of claim 1 wherein the bulking agent is a maltodextrin having a D.E. of less than 15 at a level of 10% to 20%.

14. The mix of claim 11 wherein the alkali metal pyrophosphate is present at a level of 3.5% to 6% the alkali metal orthophosphate is present at a level of 3.5% to 6% and each of these phosphates have a particle size distribution wherein 100% (by weight) passes through a No. 80 U.S. Standard Sieve.

15. The mix of claim 11 wherein the level of xanthan gum is 0.4% to 0.8%.

16. The mix of claim 15 wherein the calcium salt is calcium sulfate and the level is 0.3% to 0.4%.

17. The mix of claim 11 wherein the level of calcium salt is 0.2% to 0.6%.

18. The mix of claim 11 wherein the calcium salt is calcium sulfate and the level is 0.3% to 0.4%.

19. The mix of claim 1 wherein the added calcium to phosphate ratio is 0.01–0.08:1.0.

20. The mix of claim 1 wherein the added calcium to phosphate ratio is 0.03–0.05:1.0.

* * * * *